United States Patent [19]
Weidmann

[11] Patent Number: 6,160,965
[45] Date of Patent: *Dec. 12, 2000

[54] RECEIVING DEVICE FOR A FILM CASSETTE

[75] Inventor: Bjoern Weidmann, Braunschweig, Germany

[73] Assignee: Rollei Fototechnic GmbH, Braunschweig, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/221,592

[22] Filed: Dec. 29, 1998

[30] Foreign Application Priority Data

Dec. 31, 1997 [DE] Germany ............... 197 58 328

[51] Int. Cl.$^7$ .............. G03B 1/00; G03B 17/26; G03B 17/02
[52] U.S. Cl. .................. 396/395; 396/411; 396/511; 396/535; 396/538
[58] Field of Search ................. 396/395, 511, 396/512, 535, 536, 537, 538, 411

[56] References Cited

U.S. PATENT DOCUMENTS

| | | | |
|---|---|---|---|
| 4,516,843 | 5/1985 | Ohmura ................. | 354/173.1 |
| 4,728,979 | 3/1988 | Akitake et al. ........... | 396/132 |
| 5,122,823 | 6/1992 | Baxter et al. ............ | 396/387 |
| 5,422,695 | 6/1995 | Katagiri et al. ........... | 354/173.1 |
| 5,440,364 | 8/1995 | Takahashi ............... | 396/387 |
| 5,546,150 | 8/1996 | Wada et al. .............. | 396/538 |
| 5,621,493 | 4/1997 | Wada et al. .............. | 396/538 |
| 5,752,096 | 5/1998 | Ichino et al. ............. | 396/85 |
| 5,826,125 | 10/1998 | Nishio .................. | 396/538 |

FOREIGN PATENT DOCUMENTS 34 21 057  12/1984  Germany .

Primary Examiner—Eddie C. Lee
Attorney, Agent, or Firm—Foley & Lardner

[57] ABSTRACT

A receiving device for a film cassette, having a light-proof housing. The housing includes a film-advancing device which is assigned a gripping region for the start of the film projecting out of the film cassette. In order to facilitate insertion of the film into the camera body or into a magazine, the receiving device can be pivoted or drawn out of the housing, with parallel shifting of the axis of rotation of the receiving device, thus allowing insertion or removal of the film cassette. In the open position the inserted film cassette is spaced apart from the film-advancing device by a greater distance than in the closed position. The distance of the inserted film cassette from the gripping region in the open position is of such a size that the start of the film projecting out of the film cassette, even in the case of the smallest commercially available length, extends almost right up to the gripping region. The receiving device has a rotatably mounted cassette driver which, via a form fit or friction fit, is in rotational connection with the inserted film cassette. Upon closure of the receiving device, the cassette driver, under the action of a pushing force directed from the start of the film onto the film outlet, can be rotated, counter to the action of a resiliently elastic element, in a direction which is oriented counter to the closing movement of the receiving device. As a result, upon closure of the receiving device, the start of the film in the gripping region is retained.

6 Claims, 5 Drawing Sheets

RECEIVING DEVICE FOR A FILM CASSETTE

BACKGROUND OF THE INVENTION

Field of the Invention

The present invention relates to a receiving device for a film cassette, having a light-proof housing. The light-proof housing may be a camera body or else a magazine which can be fitted onto the camera. The film cassette is preferably for a miniature film.

SUMMARY OF THE INVENTION

One object of the present invention is to develop a film-cassette receiving device which facilitates insertion of the film into the camera body or the magazine.

According to one aspect of the present invention, an apparatus for receiving a film cassette having a portion of film (leader) extending from a film outlet, comprises a housing, a receiving device coupled to said housing for receiving the film cassette, and a film-advancing device coupled to said housing that includes a gripping region. The receiving device is capable of being translated a distance away from the film advancing device, with parallel shifting of an axis of rotation of the receiving device such that in an open position, an inserted film cassette is spaced apart from the film-advancing device by a greater distance than in a closed position. The distance of the inserted film cassette from the gripping region in the open position is of such a size that the leading end of the portion of film extending from the film outlet extends to a position in close proximity to the gripping region.

According to one preferred aspect of the present invention, the receiving device can be designed with a swinging or pivoting action. Alternatively, the receiving device can be designed with a sliding or translatory action. The inserted film cassette is thus brought into rotational connection with a cassette driver. Upon closure of the receiving device, an excessively long leader of the film causes the film cassette, with a cassette driver coupled to it, to rotate back about its own axis of rotation. As a result, a resiliently elastic element, which is in operative connection with the cassette driver, is tensioned. This tension produces a counter-torque which acts on the film cassette, thus achieving a constant pushing of the leader of the film toward the film-advancing device. The present invention provides that the leader of the film can be reliably gripped by the film-advancing device, with different lengths of the leader of the film being compensated for automatically.

According to another aspect of the present invention, a method automatically compensating for different lengths of film extending from an outlet of a film cassette so that the start of the film is automatically intercepted by a film-advancing device, comprises the steps of providing a receiving device for receiving a film cassette; and providing displacement means for translating the receiving device a distance away from the film advancing device. This displacement provides for parallel shifting of an axis of rotation of the receiving device, such that in an open position, an inserted film cassette is spaced apart from the film-advancing device by a greater distance than in a closed position of the receiving device. In the open position, the distance of the inserted film cassette from a gripping region of the film-advancing device is of such a size that the leading end of the portion of film extending from the film outlet extends to a position in close proximity to the gripping region. Further, when the receiving device is in the closed position, a constant pushing of the leader of the film toward the film-advancing device ensures that the leader of the film is gripped by the film-advancing device.

Further features of the invention form the subject matter of the claims and will be explained in more detail, in conjunction with further advantages of the invention, with reference to exemplary embodiments.

BRIEF DESCRIPTION OF THE DRAWINGS

A number of embodments of the invention, serving as examples, are illustrated schematically in the drawings, in which.

DETAILED DESCRIPTION OF THE PREFERRED EMBODIMENTS

Figure 1:
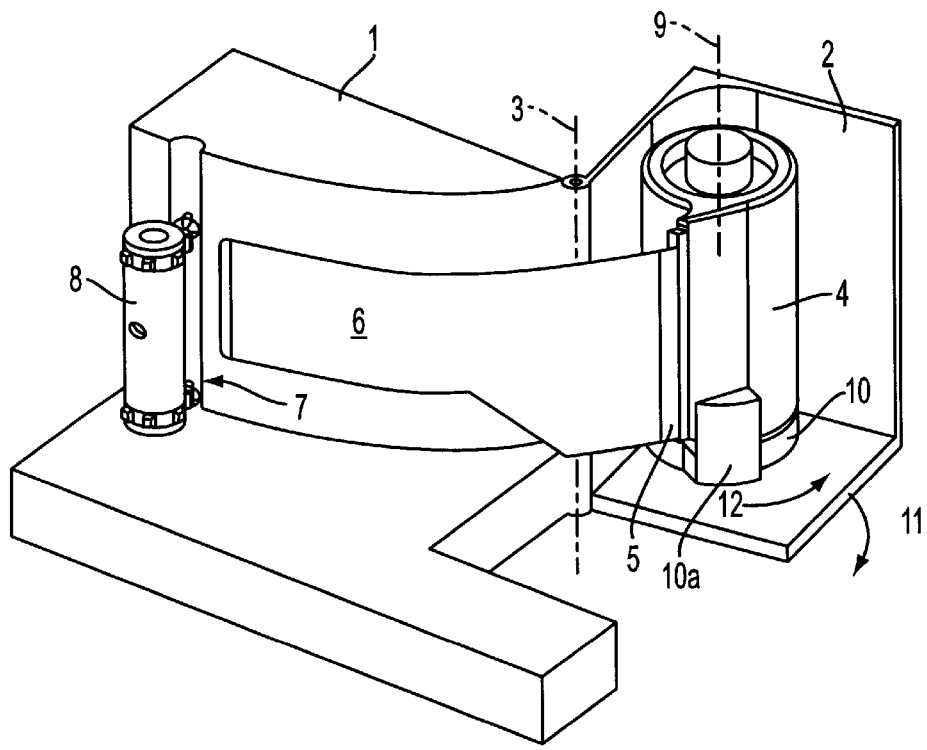
FIG. 1 shows a receiving device according to an embodiment of the present invention, with film cassette inserted in it, pivoted out of a housing into the open position.

The present invention relates to a receiving device for a film cassette, having a light-proof housing, which also includes a film-advancing device which is assigned a gripping region for the leader of the film projecting out of the film cassette. A preferred embodiment of the present invention ensures that straightforward displacement of the receiving device allows a film cassette to be inserted therein. Further, the present invention provides that when the receiving device is in its closed position, the leader of the film can be intercepted automatically by the film advancing unit. Thus, specific prior positioning of the start of the film at a marked location is dispensed with. Rather, the present invention automatically compensates for different lengths of the leader of the film projecting out of the film outlet of the film cassette.

Operation of the present invention can be achieved as follows. In a preferred embodiment, the film cassette is inserted into the receiving device. The receiving device can be designed so that it provides a displacement of the position of the inserted film cassette. For example, the receiving device can be designed to provide a swinging action. Alternatively, the receiving device can be designed to provide a sliding action. As a result, the inserted film cassette is thus brought into rotational connection with a cassette driver. Upon closure of the receiving device, an excessively long leader of the film causes the film cassette, with a cassette driver coupled to it, to rotate back about its own axis of rotation. As a result, a resiliently elastic element, which is in operative connection with the cassette driver, is tensioned. This tension produces a counter-torque which acts on the film cassette, thus achieving a constant pushing of the leader of the film toward the film-advancing device. It is thus ensured at any point in time that the leader of the film can be reliably gripped by the film-advancing device, with different lengths of the film leader being compensated for automatically.

In a preferred embodiment, the receiving device further includes a ratchet or the like which prevents rotation of the film cassette and, upon alignment of the film outlet of the film cassette in a line with the film to the film-advancing device, engages in the cassette driver and, by virtue of the receiving device being opened, is disengaged again. When the film is rewound into the cassette, the ratchet engaged in the cassette driver prevents the film cassette from being above to rotate about its own axis counter to the torque exerted on it by the resiliently elastic element.

In an exemplary embodiment, the receiving device described above can be designed to achieve the objects of the present invention according to the following features:

for insertion or removal of the film cassette, the receiving device can be pivoted or drawn out of the housing, with parallel shifting of the axis of rotation of the receiving device, such that in the open position the inserted film cassette is spaced apart from the film-advancing device by a greater distance than in the closed position, the distance of the inserted film cassette from said gripping region in the open position being of such a size that the leading end of the film projecting out of the film cassette, even in the case of the smallest commercially available leader length, extends almost right up to the gripping region;

the receiving device has a rotatably mounted cassette driver which, via a form fit or friction fit, is in rotational connection with the inserted film cassette; and upon closure of the receiving device, the cassette driver, under the action of a pushing force directed from the leader of the film onto the film outlet, can be rotated, counter to the action of a resiliently elastic element, in a direction that is oriented counter to the closing movement of the receiving device, whereby the resiliently elastic element, upon closure of the receiving device, thereby retains the leader of the film in the gripping region.

Figure 2:
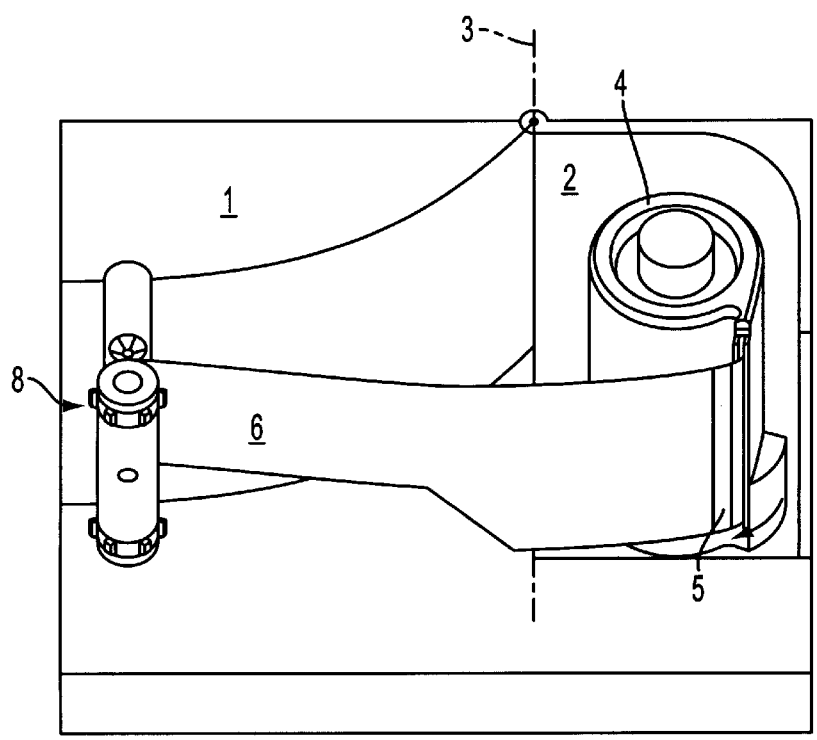
FIG. 2 shows the embodiment according to FIG. 1 with the receiving device in the closed position.

FIGS. 1 and 2 illustrate one embodiment of the present invention. FIG. 1 shows a housing 1 which, for the sake of clarity, is shown in a broken-away illustration and on which a receiving device 2 is articulated such that it can be pivoted via a hinge axis 3. The housing 1 is preferably light-proof and may be a camera body or a magazine which can be fitted onto the camera. FIG. 2 shows the receiving device 2 in its closed position, in which it closes off the housing 1 in a light-proof manner.

Inserted into the receiving device 2 is a film cassette 4, of which the leader of the film 6 projecting out of the film outlet 5 projects into a gripping region 7 in the open position of the receiving device 2, which is illustrated in FIG. 1. The gripping region is assigned to a film-advancing device 8 which is arranged in the housing 1 and, in the exemplary embodiment illustrated, is designed as a sprocket. The film advancing device can comprise, for example, a sprocket with a mating roller. Other types of film advancing devices will be apparent to those of skill in the art given the present description.

Figure 3:
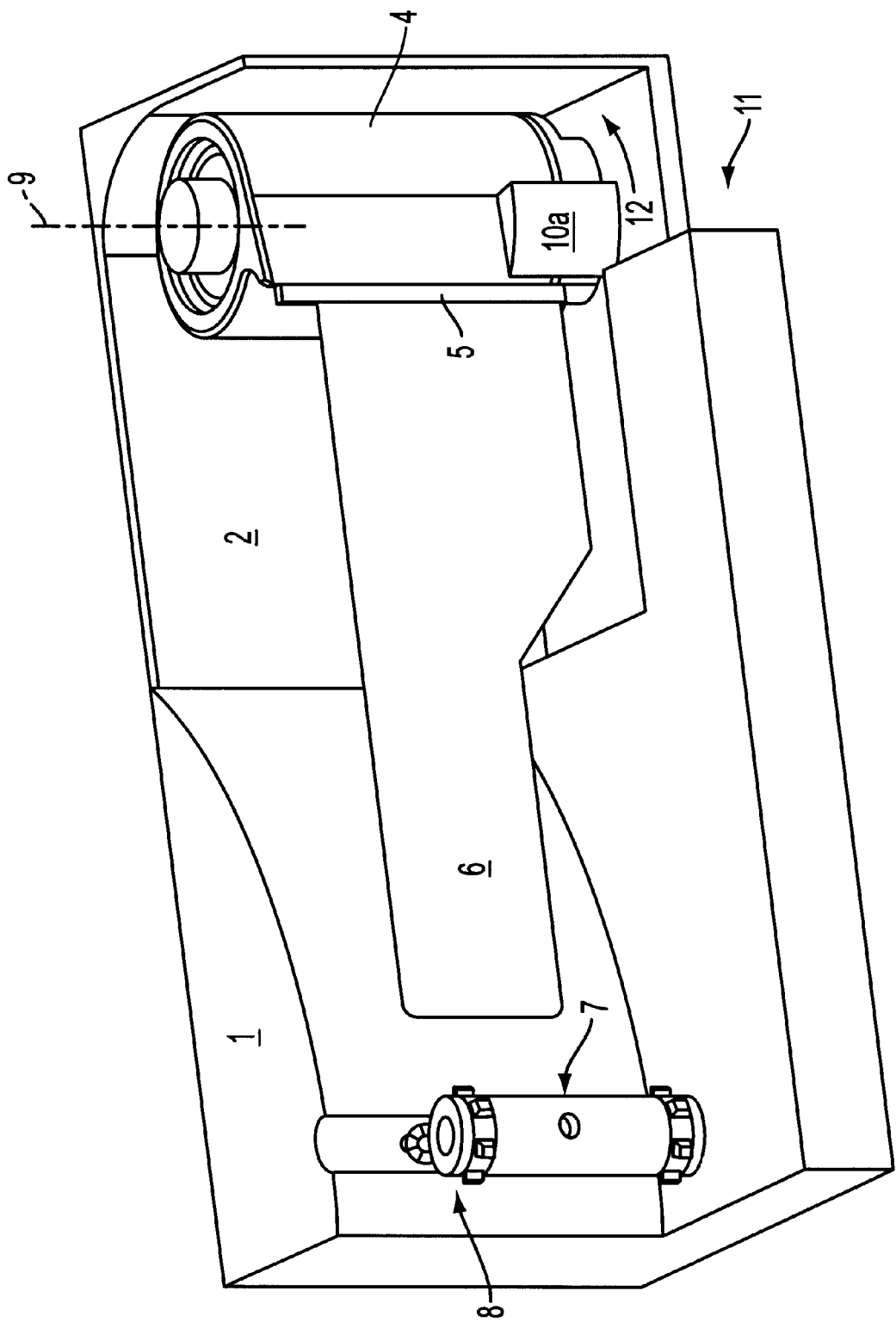
FIG. 3 shows an alternative embodiment according to the present where the receiving device, with a film cassette inserted in it, has been drawn out of the housing into the open position by translatory or sliding movement.
Figure 4:
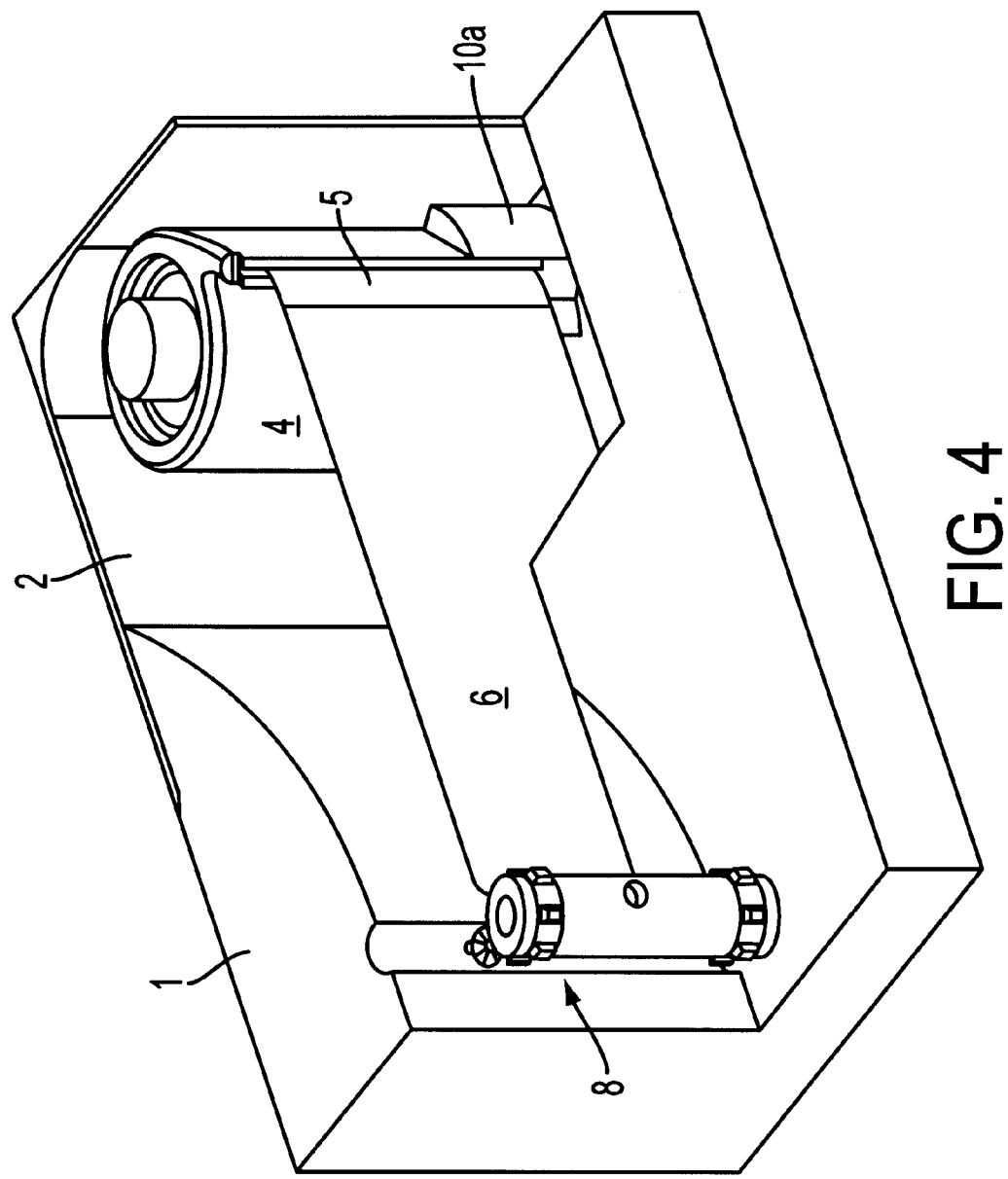
FIG. 4 shows the embodiment according to FIG. 3 with the receiving device in its closed position.

Another embodiment of the present invention is illustrated in FIGS. 3 and 4. The embodiment illustrated in FIGS. 3 and 4 differs from that of FIGS. 1 and 2 at least by way of the face that the receiving device 2, rather than being swung out of the housing 1, is drawn out of it by a sliding or translatory movement. Accordingly, FIG. 3 shows the receiving device 2 in the fully drawn-out position (open position), while FIG. 4 shows the receiving device 2 in the fully pushed-in position (closed position). Alternative means of providing displacement of the receiving device will be apparent to those of skill in the art given the present description.

It can be seen from FIGS. 1 and 3 that the receiving device 2 can be pivoted or drawn out of the housing 1, with parallel shifting of the axis of rotation 9 of the receiving device 2. Thus, in the open position the inserted film cassette 4 is spaced apart from the film-advancing device 8 by a greater distance than in the closed position. In this case, the distance of the inserted film cassette 4 from gripping region 7 in the open position is of such a size that the leader of the film 6 projecting out of the film cassette 4, even in the case of the smallest commercially available length, extends almost right up to or in close proximity to gripping region 7.

Figure 5:
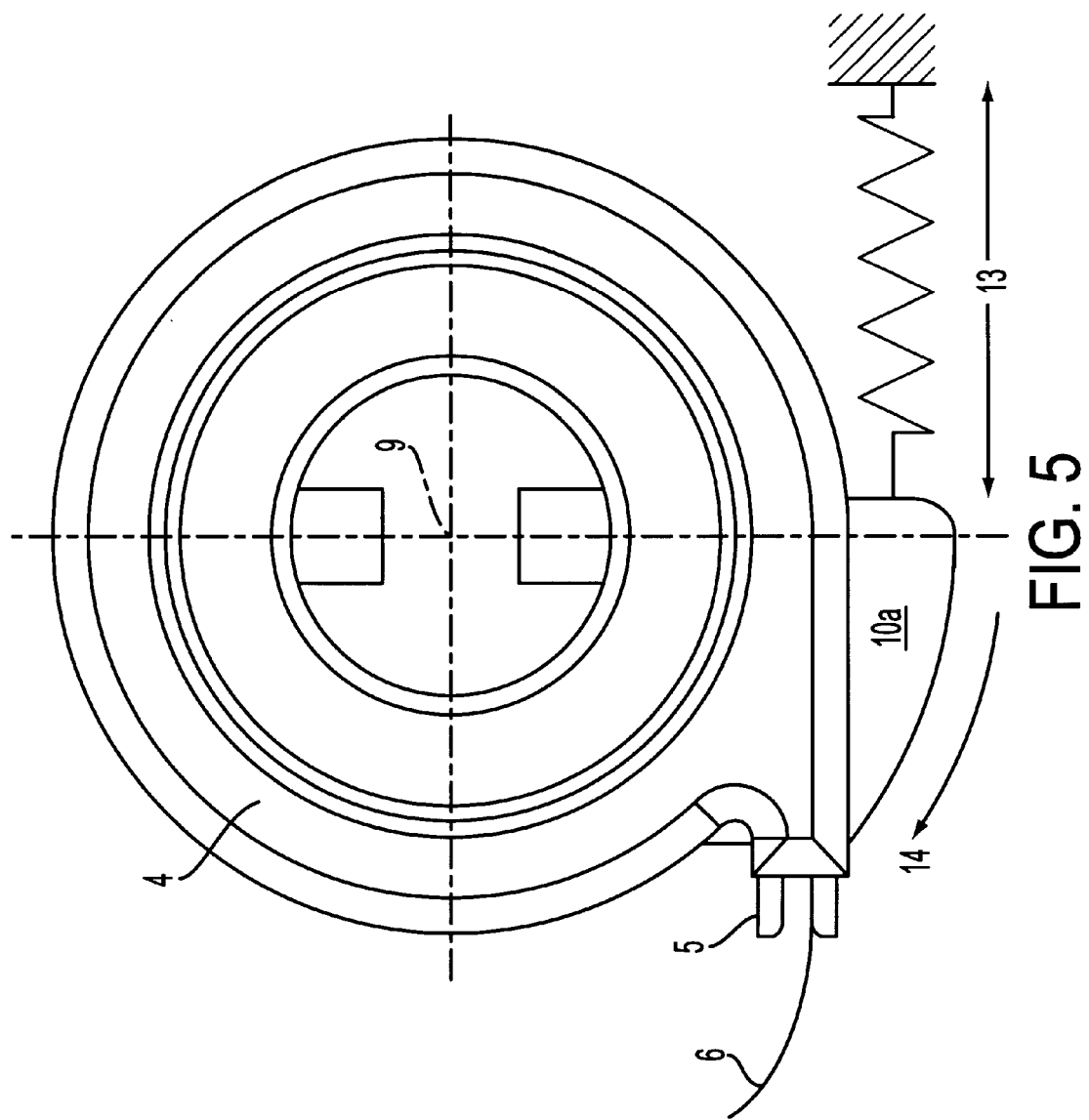
FIG. 5 shows, on an enlarged scale, a plan view of the receiving device of the present invention with a film cassette inserted in it.

The receiving device 2 can further include a rotatably mounted cassette driver 10 which, via a form or friction fit (not illustrated specifically), is in rotational connection with the inserted film cassette 4. As used herein, film cartridge 4 refers to the cartridge, that is the case enveloping the actual film or film spool. According to a feature of the present invention, film cartridge 4 is mounted for rotation about is longitudinal axis, namely on the cartridge driver 10 (shown in FIG. 1 as a disk cam having a cam 10*a*) also mounted for rotation, which is in rotational connection with film cartridge 4. Upon closure of the receiving device 2, the cassette driver 10 is under the action of a pushing force directed from the leader of the film 6 onto the film outlet 5 and produced by the start of the film 6 resting on the film-advancing device 8. The cassette driver 10 can be rotated, counter to the action of a resiliently elastic element 13 (shown in FIG. 5), in a direction 12 (shown in FIGS. 1 and 3), which is oriented counter to the closing movement 11 of the receiving device 2. Upon closure of the receiving device 2, the elastic element 13 retains the leader of the film 6 in the gripping region 7. For example, elastic element 13, can comprise a conventional spring or resilient-like device that, when it is wound up, acts like a pressure spring and seeks to rotate driver 10 about the axis of rotation 9 in the direction of the arrow 14 (i.e., clockwise in FIG. 5). As shown in FIG. 5, a first end of elastic element 13 is coupled to a cam 10*a* of cassette driver 10. When the film cartridge 4 is inserted, elastic element 13 is relaxed and exerts no torque on the drive 10.

As shown in FIG. 5, arrow 14 indicates the free direction of rotation of the film cassette 4. This free direction is counter to the backward movement of the film cassette 4, which is depicted by the arrow 12 in FIGS. 1 to 3.

According to a preferred embodiment of the present invention, also provided is a ratchet or the like (not illustrated specifically in the drawings) which prevents rotation of the film cassette 4 and, upon alignment of the film outlet 5 of the film cassette 4 in a line with the film to the film-advancing device 8, engages in the cassette driver 10. When the receiving device 2 is opened the ratchet is disengaged.

Figure 6:
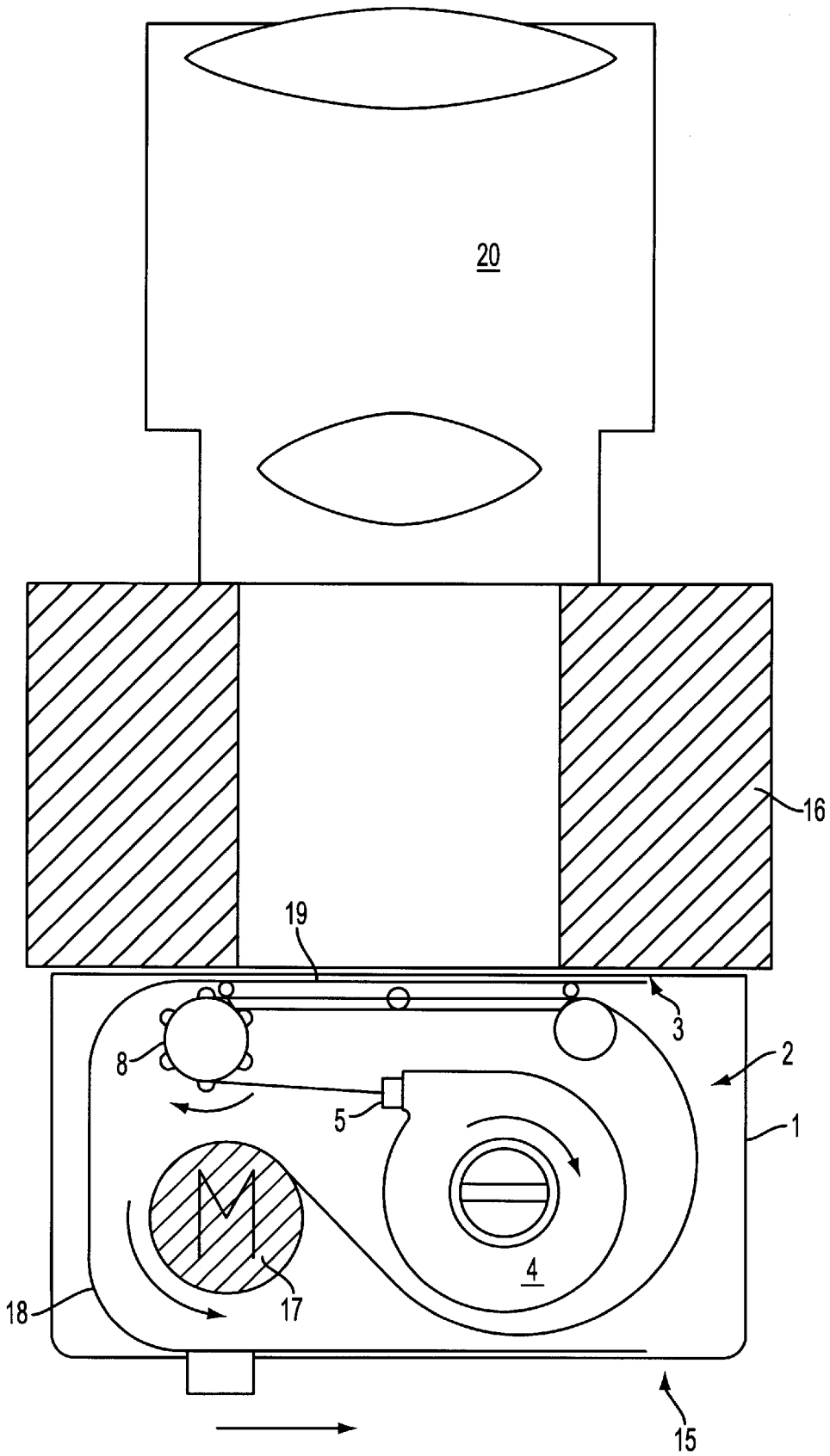
FIG. 6 shows an embodiment according to the present invention in which the housing is attached to a camera body.

As shown in the embodiment of FIG. 6, the film receiving device of the present invention can be part of a film exchange magazine 15 for a miniature camera which can be replaceably attached to the back wall of a camera body 16. This film exchange magazine includes a receiving device 2 for a film cartridge 4, a sprocket forming film-advancing device 8, a take-up drum 17, and a slide or shutter 18 for closing the film window 19 provided in housing 1. An objective 20, such as a conventional camera lens or telephoto lens, can be attached to the front portion of camera body 16.

When receiving device 2 is closed, the leader of the film 6 (due to the shortening of the film path) comes into contact with the film-advancing device 8. As receiving device 2 continues closing, the leader of the film 6 presses back against the film outlet 5 of film cartridge 4. The film cartridge 4 is thus rotated in a counterclockwise direction to compensate for a shortening of the film path, under the action of the torque applied by the film end. Driver 10 is also rotated in a counterclockwise direction since film cartridge 4 is rotatably connected with driver 10. Driver 10 is thus rotated against the action of elastic element 13, so that elastic element 13 is thereby compressed (or wound). Due to the clockwise torque continually exerted by elastic element 13 a cam 10a of on driver 10 (and thus on film cartridge 4), the leader of the film 6 is permanently held on film advancing device 8 in the gripping region 7. When film-advancing device 8 is operated, the leader of the film 6 will be securely grasped, and the film will therefore be securely transported (advanced). If the leader of the film 6 therefore has an open path (i.e., it no longer exerts a rearward thrust on the film outlet 5), a backward rotation of the film cartridge takes place under the action of elastic element 13 which turns cartridge driver 10 back, as well as film cartridge 4.

Once the film is completely exposed, the film is wound back into its cartridge 4, where the film spool is prevented from rotating the cartridge with it by friction. This rotation can be prevented by employing a ratchet or the like (not shown), as would be apparent to one of skill in the art given the present description. The receiving device 2 should not be opened until the film has been completely wound back into the film cartridge.

Although the invention has been described above by reference to certain preferred embodiments, the invention is not limited the embodiments described above. Modifications and variations of the embodiments described above will occur to those skilled in the art, in light of the above teachings. The scope of the invention is defined with reference to the following claims.

German Patent Application No. 197 58 328.8, filed Dec. 31, 1997, including the specification, the drawings, the claims, and the abstract, upon which this application is based, is incorporated herein by reference in its entirety.

What is claimed is:

1. An apparatus for receiving a film cartridge, the film cartridge having a film outlet and a film leader portion of a film extending from the film outlet, said apparatus automatically compensates for different lengths of the leader portion of the film, comprising:

a housing;

a receiving device, coupled to said housing, for receiving the film cartridge;

a film-advancing device, coupled to said housing, said film advancing device including a gripping region, wherein a distance of the inserted film cartridge from the said gripping region is such that the film leader protruding from the film cartridge extends up to a front portion of said gripping region, wherein said receiving device is capable of being translated a distance away from said film advancing device, with parallel shifting of an axis of rotation of said receiving device such that in an open position, an inserted film cartridge is spaced apart from said film-advancing device by a greater distance than in a closed position;

a rotatably mounted cartridge driver, that includes a cam disk, which is in rotational connection with the inserted film cartridge; and a spring-elastic element coupled to and acting on a cam of said cartridge driver to produce a counter-torque that acts on the film cartridge, wherein, when the receiving device is closed, the film cartridge together with the cartridge driver is rotatable under the action of a thrusting force by the film leader portion directed against said film outlet in a direction opposite the closing movement of the receiving device, against the action of the spring-elastic element thrusting against the cartridge drier, which thereby holds the film leader portion in said gripping region when the receiving device is closed.

2. The apparatus of claim 1, wherein said cartridge driver is in rotational connection with said inserted film cartridge by a form fit.

3. The apparatus of claim 1, wherein said cartridge driver is in rotational connection with said inserted film cartridge by a friction fit.

4. The apparatus of claim 1, wherein said receiving device is coupled to a hinge on said housing and is displaced in relation to said film advancing device in a pivoting motion.

5. The apparatus of claim 1, wherein said receiving device is coupled to said housing by a means for providing displacement of said receiving device in a sliding motion.

6. A camera for receiving a film cartridge, the film cartridge having a film outlet an a film leader portion of a film extending from the film outlet, said camera automatically compensates for different lengths of the leader portion of the film, comprising;

a housing;

a receiving device, coupled to said housing, for receiving the film cartridge;

a film-advancing device, coupled to said housing, said film advancing device including a gripping region, wherein a distance of the inserted film cartridge from said gripping region is such that the film leader protruding from the film cartridge extends up to a front portion of said gripping region, wherein said receiving device is capable of being translated a distance away from said film advancing device, with parallel shifting of an axis of rotation of said receiving device such that in an open position, an inserted film cartridge is spaced apart from said film-advancing device by a greater distance than in a closed position;

a rotatably mounted cartridge driver, that includes a cam disk, which is in rotational connection with the inserted film cartridge; and a spring-elastic element coupled to and acting on a cam of said cartridge driver to produce a counter-torque that acts on the film cartridge, wherein, when the receiving device is closed, the film cartridge together with the cartridge driver is rotatable under the action of a thrusting force by the film leader portion directed against said film outlet in a direction opposite the closing movement of the receiving device, against the action of the spring-elastic element thrusting against the cartridge driver, which thereby holds the film leader portion in said gripping region when the receiving device is closed.

* * * * *